US005593700A

United States Patent [19]

Stilgenbauer

[11] Patent Number: 5,593,700

[45] Date of Patent: Jan. 14, 1997

[54] FOLDING APPARATUS AND FOLDING METHOD

[76] Inventor: Günter Stilgenbauer, Bergstrasse 17, D-66957 Schweix, Germany

[21] Appl. No.: 415,813

[22] Filed: Apr. 3, 1995

[51] Int. Cl.[6] .................................................. B29C 53/04

[52] U.S. Cl. .............................. 425/3; 264/294; 264/295; 264/553; 425/383; 425/388; 425/394; 425/DIG. 33

[58] Field of Search .................................. 425/383, 388, 425/3, DIG. 33, 405.1, 394; 264/294, 295, 339, 553

[56] References Cited

U.S. PATENT DOCUMENTS

| | | | |
|---|---|---|---|
| 3,640,668 | 2/1972 | Brown, Jr. et al. | 425/346 |
| 4,106,396 | 8/1978 | Richards et al. | 425/394 |
| 4,162,884 | 7/1979 | Vetter | 425/388 |
| 4,534,725 | 8/1985 | Hemmelgarn et al. | 425/394 |
| 4,552,522 | 11/1985 | Van Melle | 425/388 |
| 4,717,524 | 1/1988 | Aoki | 425/388 |
| 4,897,030 | 1/1990 | Vajtay | 284/294 |

*Primary Examiner*—Khanh P. Nguyen
*Attorney, Agent, or Firm*—Kenyon & Kenyon

[57] ABSTRACT

The invention relates to an apparatus for folding edge sections of molded parts, blanks, or covers provided for them of leather, artificial leather, plastic, or the like, having a sizing plate provided with a cut-out, into which is inserted a pressure plate, the dimensions of the cut-out in the sizing plate corresponding to those of the finished molded part or blank or of a part of it, having a folding plate, on whose side facing the sizing plate, edges are formed for folding over the edge sections of the molded part, blank or cover, and having a base die for accommodating the sizing plate and the pressure plate, the pressure plate inserted into the cut-out of the sizing plate preferably being flexibly supported on the base tool and being vertically movable with respect to the sizing plate and the base die, and the folding plate being retained on a fixing plate, which is vertically movable, for example pneumatically or hydraulically, so as to allow the folding plate to be set down on the sizing plate, as well as to a folding method. The retooling of the apparatus to different workpieces is facilitated in accordance with the invention in that the pressure plate is able to be pulled from the side of the base die into the cut-out of the sizing plate.

15 Claims, 3 Drawing Sheets

FOLDING APPARATUS AND FOLDING METHOD

FIELD OF THE INVENTION

The invention relates to an apparatus for folding edge sections of molded parts, blanks or covers provided for the molded parts or blanks, the molded parts, blanks or covers being leather, artificial leather, plastic, or the like.

BACKGROUND OF THE INVENTION

Folding is described as the folding over of edge sections of molded parts, blanks or covers provided for the molded parts or blanks, such as shoe parts, suitcase handles, photo albums, appointment books, diaries, eyeglass cases, binders or the like. The folded-over edge section is pressed during the folding operation onto the base area of the molded part or blank and glued to it or bonded to it using compression means. Usually the folding is performed on essentially flat workpieces, for example those made of leather, artificial leather, plastic, or the like. However, the principle can also be generally applied to any desired molded parts where edge sections are bent over.

The edge sections to be bent over are generally quite narrow, requiring precise work. Therefore, the folding operation is often done manually, particularly when round corners render it relatively difficult. Folding dies are already known, however, in which the folding operation and the compressing of the folded-over edge sections are capable of being carried out automatically. A known folding die comprises a base plate, upon which a sizing plate, supported by springs, is mounted so as to be vertically movable. In the sizing plate, a cut-out is formed, into which a pressure plate is inserted that is likewise movably supported by springs on the base plate, and whose dimensions correspond exactly to the dimensions of the finished molded part or blank. In an upper die, a folding plate is movably supported by springs on a fixing plate. In the folding plate, a cut-out is formed, into which is inserted a pressure plate that is likewise movably supported by springs on the fixing plate. A circumferential projection is formed around the cut-out in the folding plate. For the folding operation, a molded part or blank is placed on the pressure plate, the edge sections of the molded part or blank to be folded over projecting on the side out over the pressure plate. The proper arrangement of the molded part or blank on the pressure plate is guaranteed by guide strips mounted on the sizing plate. At this point, the upper die is moved down, so that the pressure plate is pressed downward by the pressure plate projecting out over the folding plate and is lowered through the cut-out in the sizing plate. The edge sections of the molded part or blank projecting out over the folding plate are bent over at the edge of the cut out in the form plate when the pressure plate is pressed down, so that they essentially point up perpendicularly along the circumferential wall of the cut-out. When the top die is pressed down further, the edge sections of the molded part or blank pointing upwards are bent over by the projection formed around the cut-out in the folding plate to the inside on to the base area of the molded part or blank and pressed by an annular rim stamp, which is mounted on the fixing plate and is arranged between the rim of the cut-out in the folding plate and the pressure plate. Since the pressure plate of the top die that is pressing the pressure plate down is not able to engage with the entire surface of the pressure plate due to the rim to be left free for the edge section to be bent over, it is precisely in those edge areas of the pressure plate essential to the folding operation that a well-defined guidance of the bent-over edge sections is not possible, so that uneven folding can result. Another significant disadvantage of the known folding dies is that the pressure plate, the sizing plate, the folding plate, and the pressure plate of the top die must be precisely adjusted to one another for each molded part, so that the change of a shape or changing the dimensions of the object to be folded over requires replacement of the entire folding die. Since, as described above, the folding operation is applied to a plurality of different objects of greatly differing sizes, considerable costs are entailed by the many required sets of dies. Moreover, in the case of the known folding tool, four spring steps of the base plate, the sizing plate, the folding plate, and of the pressure stamp must be harmonized to one another, which is also very costly.

SUMMARY OF THE INVENTION

An object of the invention is to develop an apparatus of the type mentioned above so as to allow the folding machine to be retooled more simply to other molded parts or blank shapes, as well as to devise a simplified folding method.

The present invention therefore provides a sizing plate provided with a cut-out, into which is inserted a pressure plate, the dimensions of the cut-out in the sizing plate corresponding to those of the finished molded part or blank or of a part of it, having a folding or bugg plate, on whose side facing the sizing plate edges are formed for folding over the edge sections of the molded part, blank or cover, and having a base die for accommodating the sizing plate and the pressure plate, the pressure plate inserted into the cut-out of the sizing plate preferably being flexibly supported on the base die and being vertically movable with respect to the sizing plate and the base die, and the folding plate being retained on a fixing plate, which, for example, is vertically movable, pneumatically or hydraulically, so as to allow the folding plate to be set down on the sizing plate. The present invention also provides a folding method.

The objective then is solved by the invention essentially in that the pressure plate is able to be pulled into the cut-out of the sizing plate from the side of the base die, i.e. from below. Since in the case of the apparatus according to the invention, the pressure plate is pulled away, downwards, a pressure stamp in the top die is no longer needed. Only the folding plate in the top die has to be adapted to the desired shape of the molded part of blank, so that in the case of a retooling to other molded-part or blank shapes in the top die, one only needs to replace the folding plate. The fixing plate, which is joined to the mechanisms provided for the vertical movement of the top die, can be used, on the other hand, for widely varying shapes of molded parts or blanks. Moreover, the overall design of the top die is considerably simplified.

The retooling of the folding machine when making the conversion to other die shapes is additionally facilitated by one refinement of the invention in that the pressure plate is mounted on at least one stamp, which is supported flexibly on the base die and is vertically movable. In the case of the folding apparatus according to the invention, only the sizing plate, the pressure plate, and the folding plate need to be replaced to allow an adaptation to other shapes or dimensions of the molded parts or blanks, while the base die and the fixing plate can be used for different workpiece shapes.

In accordance with one further development of the invention, the lowering of the base plate is facilitated in that a recess is formed in the base die on the side facing the sizing plate, over which the sizing plate can be placed so as to form a chamber, and in that the recess is connected via a vacuum line to a vacuum source. Producing a vacuum in the chamber of the base die causes the movably supported pressure plate to be lowered into the cut-out of the sizing plate, until the vacuum attains equilibrium with the force of the springs supporting the pressure plate. When the pressure plate is lowered, the molded part situated on the pressure plate or on the blank is pulled down along with it, so that the edge sections projecting out over the pressure plate are bent upwards at the edge of the cut-out in the sizing plate. Because of the slide gap existing between the pressure plate and the edge of the cut-out, the vacuum also acts upon the material of the molded part or blank, pulling it down in the edge areas of the pressure plate, thus ensuring that the base area of the molded part or blank corresponds exactly to the base area of the pressure plate.

To be able to reduce the power of the vacuum as such when smaller pressure plates are used, a further development of this inventive idea provides for inserting a frame or structure into the cut-out in the base die, to reduce the volume of the chamber to be evacuated.

The manufacturing of the apparatus according to the invention is simplified in that the base die has a base plate and an intermediate plate, and in that the recess is formed in the intermediate plate.

In this case, the intermediate plate can be moved vertically in a direction opposite the base plate and is preferably supported by springs on the base plate. Such a flexibly constructed base die ensures that there will be no excessive force caused by a machine operating error or the like exerted on the molded part or the blank that could damage it. An end position can be established by arranging spacer strips, for example, between the intermediate plate and the base plate.

Since in the case of the folding apparatus according to the invention, no edge stamp is provided for pressing down the folded-over edge sections, it is necessary to provide for another support when compressing edge sections and the blank base area. Therefore, in one preferred refinement of the invention, a depression is formed in the side of the folding plate facing the sizing plate, and its edges are used for folding over the edge sections of the molded parts or blanks. The edge sections of the molded part or blank are bent over the edge of the depression in the folding plate, the pressing of the edge sections on to the base area of the molded part or blank taking place simultaneously in the depression.

A proper arrangement of the molded part or blank on the pressure plate is guaranteed according to the invention in that guide strips are arranged on the sizing plate. Appropriate recesses are formed in the side of the folding plate facing the sizing plate, in which recesses the guide strips are accommodated when the folding plate is set down on the sizing plate. Therefore, the folding plate must be adapted by small milled cut-outs for the depression and the recesses for the guide strips to different workpiece sizes. Compared to the previously required adaptation of the folding plate, the pressure stamp and of the rim stamp, this provides considerable facilitation when converting the machines to other workpiece sizes.

In the case of preferred refinements of the invention, the edge sections are folded over in that the rim edges of the depression in the folding plate have a slant toward the center of the folding plate or have a concave radius. The slant or the radius guides the edge sections, so that they are folded over to the inside.

The replacement of the folding plate is facilitated in accordance with the invention in that the folding plate is able to be affixed by means of quick-change fasteners to the fixing plate. In the case of one preferred specific embodiment, the folding plate is magnetically retained on the fixing plate.

To facilitate the pressing of the folded-over edge sections with the base area of the molded part or of the blank, the invention provides for the folding plate and/or the pressure plate to be heatable.

A folding method comprises, for example, the following steps:

The molded part or the blank of leather, artificial leather, plastic, or the like is placed, optionally together with the cover provided for it, on a pressure plate that is inserted in a cut-out in a sizing plate, there being edge sections of the molded part, blank or cover that project out over the pressure plate;

the pressure plate is moved toward a base tool on which the pressure plate is preferably flexibly supported, the pressure plate being lowered into the cut-out in the sizing plate, so that the edge sections of the molded part, blank or cover projecting out on the side over the pressure plate on the edge of the cut-out in the sizing plate are essentially positioned to point up perpendicularly;

a folding plate is placed upon the sizing plate so as to allow the edge sections of the molded part, blank or cover that point up essentially perpendicularly to be folded over to the inside by means of edges formed on the side of the folding plate facing the sizing plate, on to the molded part or the blank, the pressure plate being pulled from the side of the base tool, i.e. from below, into the cut-out of the sizing plate.

In the case of one preferred further development of the present invention, a recess is formed in the base tool and is sealed by the sizing plate and the pressure plate so as to form a chamber. The recess is placed under a vacuum, so that the pressure plate is pulled against the action of springs or the like supporting the pressure plate into the cut-out in the base tool. It is thus achieved in a simple manner that the pressure plate is lowered uniformly into the cut-out in the sizing plate, it being possible to adjust, by means of appropriately provided stop means, how far the pressure plate is pulled into the sizing plate.

To be able to adapt the power of the vacuum pump to smaller pressure plates, the invention provides for a structure to be inserted into the recess in the base tool to reduce the chamber volume.

In the case of one preferred specific embodiment of the invention, after the folding plate is placed on the sizing plate, the folding plate is pressed down further, and the sizing plate is carried past the pressure plate inserted into the cut-out in the sizing plate, until the folding plate rests on the pressure plate, so that the bent-over edge sections of the molded part, blank or cover are pressed against the base area of the molded part or blank.

In the case of another preferred specific embodiment of the invention, after the folding plate is set down on the sizing plate, the pressure plate is pressed upwards against the folding plate until the pressure plate abuts on the folding plate, so that the bent-over edge sections of the molded part, blank or cover are pressed onto the base area of the molded part or blank.

The pressing and bonding of the edge sections onto the base area of the molded part or blank may be improved according to the invention in that the folding plate and/or the pressure plate may be heated.

BRIEF DESCRIPTION OF THE DRAWINGS

Further developments, advantages and possible uses of the invention are shown in the following description of exemplary embodiments and the drawings.

DETAILED DESCRIPTION

Figure 1:
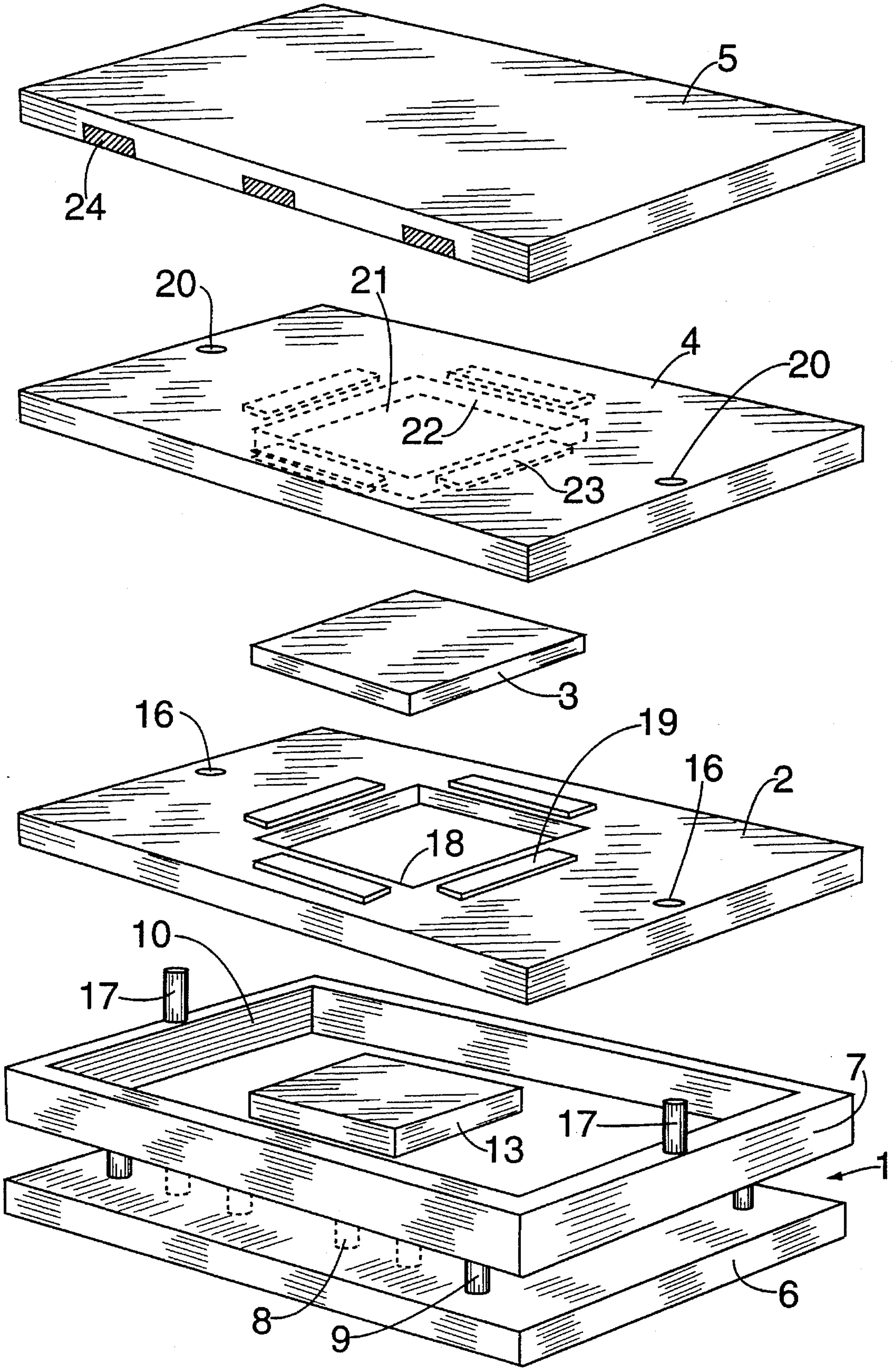
FIG. 1 shows a schematic exploded view of the apparatus according to the invention.

The apparatus depicted in FIG. 1 for folding over edge sections of molded parts, blanks or covers provided for them essentially comprises a base die 1, a sizing plate 2, a pressure plate 3, a folding plate 4 and a fixing plate 5.

As shown in FIGS. 1 and 2*a*–2*d*, the base tool 1 has a base plate 6, on which an intermediate plate 7 is flexibly supported by springs 8, the intermediate plate 7 being guided by guides 9 in the base plate 6. A recess 10 is formed in the intermediate plate 7 on its upward-turned side and is joined via a vacuum line 11 to a vacuum source (not shown). A feed-through opening 12 is formed in the middle of the intermediate plate 7 and has a vertically movable stamp 13 inserted into it in a sealed manner. The stamp 13 is guided by guides 14 in the base plate 6 and is supported by springs 15 on the base plate 6.

In its edge areas, the sizing plate 2 has guide openings 16, into which engage guide pins 17 mounted on the intermediate plate 7 of the base die 1. A cut-out 18, whose dimensions correspond exactly to those of a base area 27 of a finished molded part or blank 26, is formed in the center of the sizing plate 2. Arranged around the cut-out 18 of the sizing plate 2 on the top side of the sizing plate 2 are guide strips 19, whose arrangement and spacing correspond to the dimensions of the molded part or blank 26 before the edge sections 25 are folded over.

The pressure plate 3 is inserted into the cut-out 18 of the sizing plate 2, the dimensions of the pressure plate 3 corresponding to those of the cut-out 18 in the sizing plate 2 so as to allow the pressure plate 3 to move with sliding action in the cut-out 18 of the sizing plate 2. The top-surface profile of the pressure plate 3 corresponds to the negative profile of the molded part or blank 26 to be machined.

At its edge areas, the folding plate 4 has guide openings 20 for guiding the folding plate 4 in the guide pins 17 of the base die 1. On the bottom side of the folding plate 4 facing the sizing plate 2, a depression 21 is formed whose dimensions correspond more or less to those of the cut-out 18 in the sizing plate 2 and whose rim edges 22 are slightly chamfered to the inside or have a concave radius. Moreover, recesses 23 are formed on the bottom side of the folding plate 4, whose arrangement and dimensions essentially correspond to the arrangement and dimensions of the guide strips 19 on the sizing plate 2, so that the guide strips 19 are accommodated when the folding plate 4 is placed in the recesses 23 and so that the folding plate 4 is able to be placed flush on the sizing plate 2.

The folding plate 4 is retained, for example, by means of quick-change fasteners or magnets 24 to the fixing plate 5.

Figure 2A:
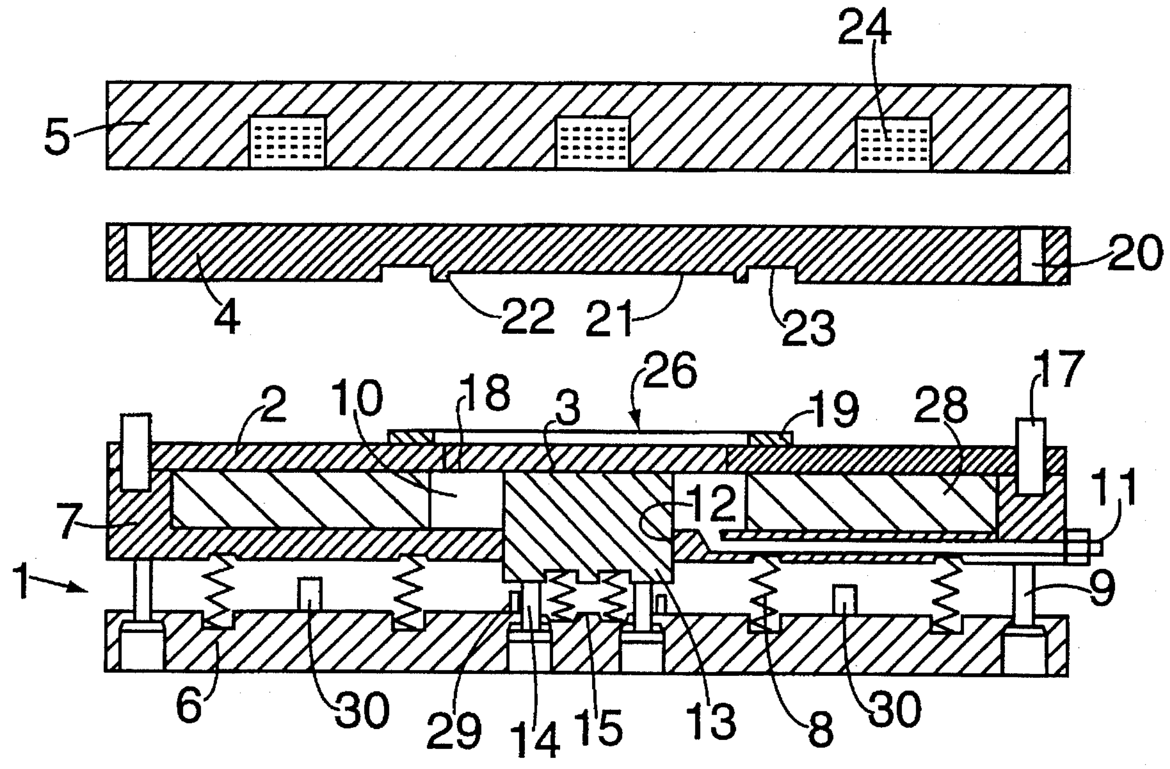
FIGS. 2*a*, 2*b*, 2*c*, and 2*d* show schematic transverse representations of the apparatus according to FIG. 1 in various successive positions during the folding operation.

In the following, the operation of folding over the edge sections 25 of molded parts or blanks 26 is described on the basis of FIG. 2*a*–2*d*:

In the initial position of the folding apparatus shown in FIG. 2*a*, the sizing plate 2 rests on the intermediate plate 7 of the base die 1. Here, it is guaranteed that the sizing plate 2 is properly arranged on the base tool 1 via the guide pins 17, which engage with the guide openings 16 of the sizing plate 2. The pressure plate 3 resting on the stamp 13 of the base tool 1 is inserted into the cut-out 18 of the sizing plate 2 so as to allow the pressure plate 3 to end flush with the sizing plate 2. The folding plate 4 retained at the fixing plate 5 is situated with some clearance above the base die 1 and the sizing plate 2, so that the blank 26 can be placed on the pressure plate 3. In this case, the proper arrangement of the blank 26 is guaranteed by the guide strips 19, between which the blank 26 is arranged.

In FIG. 2*a*, the fixing plate 5 and the folding plate 4 to be secured to it are depicted with clearance from one another. Since only the folding plate is mandatory for the folding operation in the top die, the fixing plate 5 is not additionally shown in FIGS. 2*b* through 2*d*.

Figure 2B:
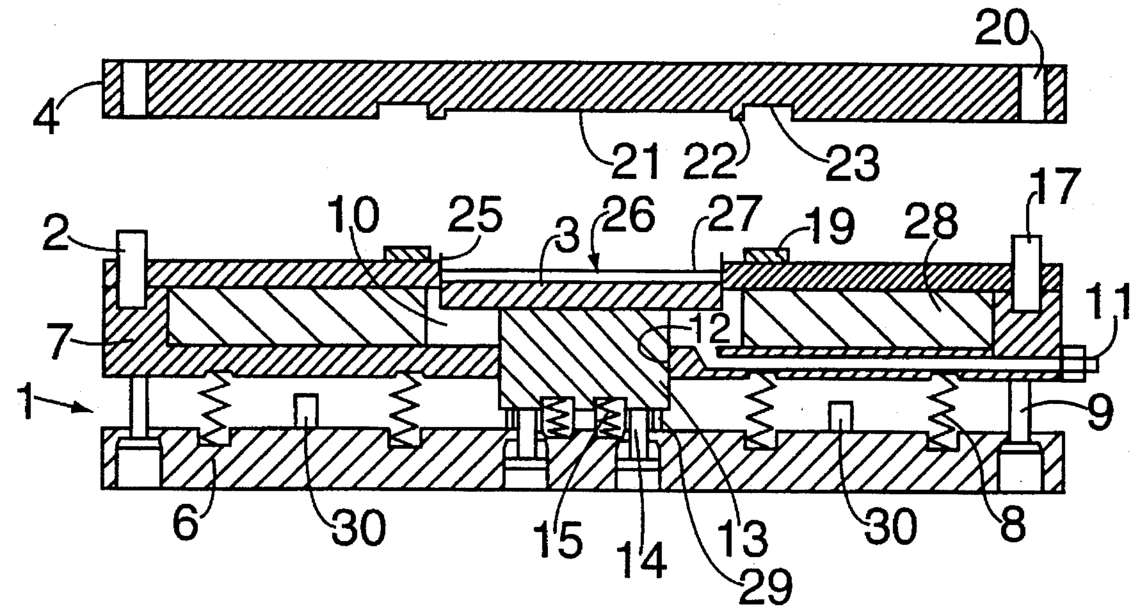

As illustrated in FIG. 2*b*, after the blank 26 is set down, a vacuum produced by a vacuum pump (not shown) is applied to the recess 10 in the intermediate plate 7 that is sealed by the sizing plate 2 and the pressure plate 3. Since the stamp 13 is arranged to be vertically movable against the force of the springs 15, the pressure plate 3 resting on the stamp 13 is pulled down through the cut-out 18 in the sizing plate by the vacuum produced in the recess 10. By means of locating stops 29, on which the stamp 13 is placed, it is established how far the pressure plate 3 is pulled into the cut-out 18 in the sizing plate 2.

The blank 26, which rests on the pressure plate 3 and has edge sections 25 that project out over the pressure plate 3, is pulled down with the pressure plate 3, through which means the edge sections 25 of the blank 26 along the edge of the cut-out 18 in the sizing plate 2 point essentially perpendicularly upward. Since the sealing action achieved by the sliding fit of the pressure plate 3 in the cut-out 18 of the sizing plate 2 is not complete, the blank 26 in the edge area of the pressure plate 3 is pulled firmly by the vacuum into the corner produced between the pressure plate 3 and the cut-out 18 of the sizing plate 2, so that the blank 26 precisely reaches the desired base area of the finished workpiece.

Figure 2C:
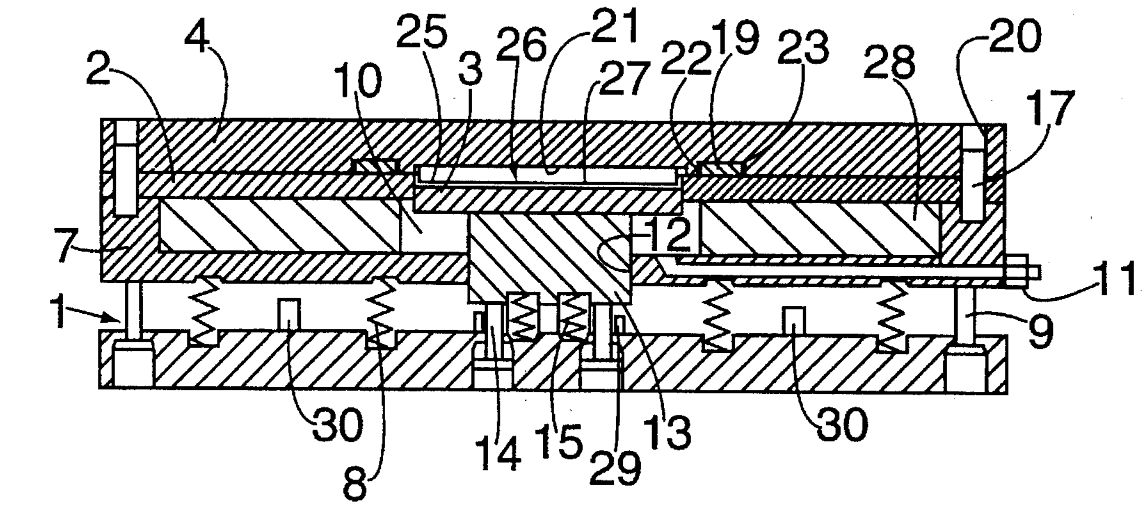
Figure 2D:
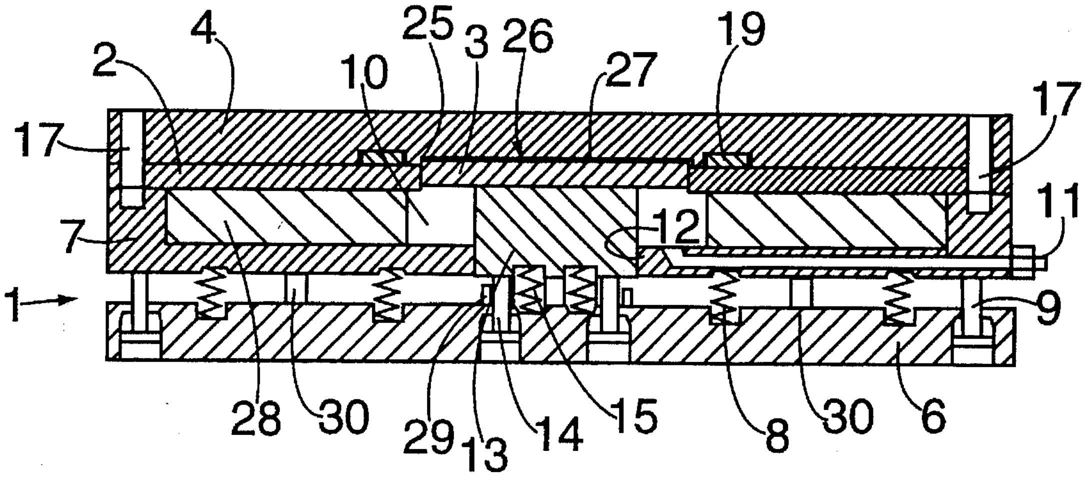

In accordance with FIG. 2*c*, the folding plate 4 is placed on the sizing plate 2, the folding plate 4 likewise being guided by the guide pins 17 of the base die 1. The rim edges 22 of the depression 21 that are chamfered or provided with a radius cause the edge sections 25 of the blank 26 projecting out over the sizing plate 2 to be bent to the inside.

By pressing the folding plate 4 down further and, consequently, the sizing plate 2 abutting on it, as well as the intermediate plate 7 of the base tool 1, against the force of the springs 8, the sizing plate 2 is pressed down past the pressure plate 3 retained on the stamp 13, the bent-over edge sections 25 of the blank 26 being pressed against the base area 27 of the blank 26. The displacement of the sizing plate 2 in relation to the pressure plate 3 is limited by spacer strips 30, against which the intermediate plate 7 comes to rest. The displacement path of the sizing plate 2 can be varied by replacing the spacer strips 30.

According to another specific embodiment of the invention that is not shown, after the folding plate 4 is placed on the sizing plate 2, the folding plate 4 is not pressed down further, instead, the stamp 13 is pressed upwards, for example hydraulically; together with the pressure plate 3, so that the pressure plate 3 passes through the cut-out 18 of the sizing plate 2 and abuts in the area of the depression 21 against the folding plate 4. This causes the bent-over edge sections 25 of the blank 26 to likewise be pressed against the base area 27 of the blank 26.

To improve the action of the pressing operation and, if desired, to weld the edge sections 25 of the blank 26 together with the base area 27, the folding plate and/or the pressure plate 3 can be heated.

To be able to reduce the power of the vacuum pump (not shown) when the base die 1 is being used, even given smaller blanks 26 or pressure plates 3, structures 28 of a properly adapted size can be inserted into the recess 10 of the intermediate plate 7 of the base tool 1, so that the volume to be evacuated can be kept as small as possible.

As revealed by the above description, the parts of the folding apparatus which must be adapted to the workpiece to be machined, i.e. the sizing plate 2, the pressure plate 3 and the folding plate 4, are easily interchangeable, in that the sizing plate 2 is removed from the guide pins 17 of the base tool 1, and the pressure plate 3 from the stamp 13, and in that the folding plate 4 is disengaged from the fixing plate 5 by releasing the quick-change fastener or interrupting the magnet 24. After the plates 2, 3, 4, which have been adapted to a specific workpiece form, are removed, they can be exchanged for corresponding other plates 2, 3, 4. It is not necessary to replace the base tool 1 and the fixing plate 5, on which are situated all of the connections (not shown) for applying pressure, for example hydraulic connections.

It is relatively simple to manufacture the plates 2, 3, 4 to be replaced, since one merely needs to produce smaller milled cut-outs in the folding plate 4, while, in the sizing plate 2, only the dimensions of the cut-out 18 and the arrangement of the guide strips 19 have to be changed. Also, one merely needs to adapt the pressure plate 3 to the desired top surface of the molded part so that, after that, it can be placed simply on the stamp 13 of the base tool 1.

What is claimed is:

1. An apparatus for folding edge sections of a workpiece comprising:

a sizing plate having a cut-out, a sizing plate top surface and a sizing plate bottom surface;

a pressure plate for insertion into the cut-out and for supporting the workpiece;

a folding plate having a folding plate bottom surface, the folding plate bottom surface having rim edges for folding over edge sections of the workpiece, the folding plate being vertically moveable so as to allow the folding plate bottom surface to contact the sizing plate top surface; and a base die for accommodating the sizing plate and the pressure plate, the pressure plate being vertically movable with respect to the sizing plate and capable of being pulled from below to lower the pressure plate.

2. The apparatus as recited in claim 1 wherein the pressure plate is flexibly supported on the base die.

3. The apparatus as recited in claim 1 further comprising at least one stamp supported flexibly on the base die and vertically movable on said base die, the pressure plate being mounted on the stamp.

4. The apparatus as recited in claim 1 wherein the base has a recess over which said sizing plate is located to form a chamber, the chamber being connected via a vacuum line to a vacuum source.

5. The apparatus as recited in claim 4 further comprising a structure for insertion into the recess in the base die.

6. The apparatus as recited in claim 4 wherein the base die comprises a base plate and an intermediate plate, and the recess is formed in the intermediate plate.

7. The apparatus as recited in claim 6 wherein the intermediate plate is vertically moveable in a direction opposite the base plate.

8. The apparatus as recited in claim 7 further comprising springs for supporting the intermediate plate on the base plate.

9. The apparatus as recited in claim 1 wherein the folding plate has a depression in the folding plate bottom surface.

10. The apparatus as recited in claim 1 further comprising guide strips arranged on the sizing plate top surface, and the folding plate bottom surface has recesses in which said guide strips may be accommodated when the folding plate is set down on the sizing plate.

11. The apparatus as recited in claim 1 wherein the rim edges of the depression in the folding plate have a slant toward the center of said folding plate or a concave radius.

12. The apparatus as recited in claim 1 further comprising a fixing plate for contacting the folding plate.

13. The apparatus as recited in claim 12 further comprising quick-change fasteners for affixing the folding plate to the fixing plate.

14. The apparatus as recited in claim 12 wherein the folding plate is magnetically retained on the fixing plate.

15. The apparatus as recited in claim 1 wherein at least one of the folding plate and the pressure plate are heatable.

* * * * *